United States Patent
Hegde et al.

(10) Patent No.: US 9,344,258 B2
(45) Date of Patent: May 17, 2016

(54) METHOD AND APPARATUS FOR CONFIGURING RADIO FREQUENCY RESOURCES FOR A CUSTOMER PREMISES BASE STATION

(75) Inventors: Harsha Hegde, Hawthorn Woods, IL (US); David M. Beischer, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2212 days.

(21) Appl. No.: 12/342,089

(22) Filed: Dec. 23, 2008

(65) Prior Publication Data

US 2010/0157911 A1    Jun. 24, 2010

(51) Int. Cl.
  *H04L 5/00* (2006.01)
  *H04W 64/00* (2009.01)
  *H04W 24/02* (2009.01)

(52) U.S. Cl.
  CPC .............. *H04L 5/0091* (2013.01); *H04L 5/006* (2013.01); *H04L 5/0007* (2013.01); *H04W 24/02* (2013.01); *H04W 64/003* (2013.01)

(58) Field of Classification Search
  None
  See application file for complete search history.

(56) References Cited

U.S. PATENT DOCUMENTS

| 7,107,605 | B2 | 9/2006 | Janik |
| D558,460 | S | 1/2008 | Yu et al. |
| 2009/0093246 | A1* | 4/2009 | Czaja et al. ............... 455/422.1 |

OTHER PUBLICATIONS

Carlaw, Stuart et al.: Femtocell Access Points, Fixed-Mobile Convergence for Residential, SMB, and Enterprise Markets, Research Report, 2006, ABI Research, abiresearch.com, pp. 1-74.
Huawei showcases its ALL IP Broadband, Mobility and convergence solutions at CeBIT 2008, http://www.huawei.com/news/view.do?id-5440&cid-42, Huawei Technologies Co., Ltd. 1998-2008, pp. 1-2.

* cited by examiner

*Primary Examiner* — Jackie Zuniga Abad
(74) *Attorney, Agent, or Firm* — Faegre Baker Daniels LLP (57) ABSTRACT

A method and apparatus are provided for manually or automatically configuring radio frequency (RF) resources for a customer premises base station (CPBS). In an embodiment, the CPBS prompts a user for RF resource configuration parameter values, and the user inputs RF resource configuration parameter values, such as physical features of a customer's premises, to the CPBS. The CPBS then conveys RF resource configuration information to a wireless broadband communications system operator, wherein the RF resource configuration information is based on the RF resource configuration parameter values received from the user, and in response to conveying the received RF resource configuration information, the CPBS receives an RF resource allocation. Another embodiment provides for the CPBS to collect RF resource configuration parameter values associated with a customer's premises in an automated fashion that serve as a basis for an RF resource allocation adjustment by a system operator.

14 Claims, 12 Drawing Sheets

User Assisted Network Planning - Manual Configuration Algorithm

```
Procedure manualConfig (radius, floors, total living space, # exterior walls, # interior walls, # doors, # windows )
{
    avg # exterior walls = (# exterior walls / 4)
    avg # doors = greater of ( (total living space/floors) * (2 doors/800 sq ft), # doors/floors)
    avg # windows = greater of ((total living space/floors) * (2 windows/800 sq ft), # windows/floors)
    avg # interior walls = greater of ((total living space/floors) * (2 walls/800 sq ft), # interior walls/floors)
    avg # doors = greater of ( (total living space/floors) * (2 doors/800 sq ft), # doors/floors)
    avg # windows = greater of ((total living space/floors) * (2 windows/800 sq ft), # windows/floors)
    freeSpaceLoss = 20 Log₁₀ (radius in meters) + 20 Log₁₀ (frequency in hertz) – 147.56
    estimatedPathLoss = (avg # exterior walls * 15db) + (avg # interior walls * 10db) + (avg # windows * 1db) + (avg # doors * 3db) + freeSpaceLoss
    desiredRSSI = -90 dB
    estimatedTransmitPowerOutput = desiredRSSI + estimatedPathLoss
    pushParamViaTr-069ToOperator(estimatedTransmitPowerOutput)
}
```

User Assisted Network Planning - Automated Configuration Algorithm

Procedure AutoConfig ( IMSI or PhoneNumber for device to use for test)
{
    check state of mobile using input IMSI or Phone Number;
    if mobile is in active state
        wait for mobile to go idle
    if mobile is in idle state
    {
        page mobile to bring it onto traffic channel
        respond to any non-test specific network request for user with failure
        start forward and reverse test applications to send Packet Data Units at L2 to mobile
        (TAS procedures defined in 3GPP2 C.S0029 section 4.2/4.3/4.4/4.5)
        if TAS can be used/is successful
            go to run_test_TAS (loopback)
        else
            go to run_test (no loopback)
    }
}

FIG. 8A

```
run_test_TAS:

While (final location of Femto not determined and not end of test)
{
    user initiated start
    // For Forward and Reverse directions
    for (each L2 rate in the rate set; based on desired RSSI of -90db)
    {
        clear statistics
        start timer
        Transmit 1000 PDU's at that rate
        compute Throughput and Packet Error rate as defined in
        (TAS procedures defined in 3GPP2 C.S0029 section 4.2/4.3/4.4/4.5)
        save time, exp. thruput, obtained thruput, exp. PER, obt. PER
    }
    display to user - time vs performance charts to help better locate picture frame
}
for each desired L2 rate
    pushParamViaTr-069ToOperator(exp. Thruput, obtained thruput, exp. PER, obt. PER)
    // Operator management system then readjusts radio params based on this report
end;
```

FIG. 8B

```
run_test:
    While (final location of Femto not determined and not end of test)
    {
        user initiated start
        // For Forward direction ONLY
        for (each L2 rate in the rate set; based on desired RSSI of -90db)
        {
            clear statistics
            start timer
            Transmit 1000 PDU's at that rate with psuedo UDP/IP packets in ack mode
            monitor HARQ, ack performance
            save time, exp. HARQ perf, obt. HARQ perf, exp. Ack perf, obt. Ack perf
        }
        display to user - time vs performance charts to help better locate picture frame
    }
    for each desired L2 rate
        pushParamViaTr-069ToOperator(exp. HARQ perf, obt. HARQ perf, exp. Ack perf, obt. Ack perf ) // Operator management system then readjusts radio params based on this report
    end;
}
```

FIG. 9

METHOD AND APPARATUS FOR CONFIGURING RADIO FREQUENCY RESOURCES FOR A CUSTOMER PREMISES BASE STATION

FIELD OF THE INVENTION

The present invention relates generally to Orthogonal Frequency Division Multiplexing (OFDM) communication systems, and, in particular, to channel quality feedback in an OFDM communication system.

BACKGROUND OF THE INVENTION

As third generation (3G) wireless communications technologies get rolled out to the general public, the issue has arisen as to how to provide comprehensive coverage at a minimal cost. Toward that end, instead of blanketing an area with 3G base stations, it has been proposed to use fewer base stations and then use femtocells to fill in gaps or holes in coverage. Femtocells are smaller, less expensive base stations that are very limited in maximum power and coverage area.

One such use of a femtocell is in the home, where the femtocell can provide cellular and broadband service to subscribers in the home. Typically, a user would buy the femtocell from a broadband system operator, and then bring it home and plug it in to a broadband connection. Upon being plugged in, the femtocell registers with the system operator and conveys its location to the system operator. For example, it is expected that a femtocell will include a Global Positioning Satellite (GPS) receiver and will use its GPS functionality to determine its location. The femtocell then sends its determined location to the system operator and, in response, the system operator instructs the femtocell as to the frequencies, transmit power levels, and PN offsets to use. In this manner, the operator is able to plan the operator's system and to minimize any interference that the femtocell will introduce to adjacent coverage areas.

However, the operator does not know the true coverage requirements for a home where such a femtocell may be installed. As a result, and by way of example, the operator may allocate insufficient power to provide acceptable coverage throughout the home or may allocate more power than is needed. Therefore, a need exists for a method and apparatus that permits a broadband system operator to determine a specific user's needs and to allocate resources to a femtocell in accordance with those needs.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that permits a broadband system operator to determine a specific user's needs and to allocate resources to a femtocell in accordance with those needs, a method and apparatus are provided for manually or automatically configuring radio frequency (RF) resources for a customer premises base station (CPBS). In a manual embodiment, the CPBS prompts a user for RF resource configuration parameter values. In response to the prompt, the user inputs RF resource configuration parameter values, such as physical features of a customer's premises, to the CPBS. The CPBS then conveys RF resource configuration information to a wireless broadband communications system operator, wherein the RF resource configuration information is based on the RF resource configuration parameter values received from the user, and in response to conveying the received RF resource configuration information, the CPBS receives an RF resource allocation. Another embodiment provides for the CPBS to collect RF resource configuration parameter values associated with a customer's premises in an automated fashion, determine a throughput and an error rate based on the collected values, and convey the determined throughput and error rate to a wireless broadband communications system operator. The operator then uses the throughput and error rate to adjust RF resources allocated to the CPBS.

Generally, an embodiment of the present invention encompasses a method for configuring (RF resources for a CPBS. The method includes prompting, by the CPBS, a user for RF resource configuration parameter values, in response to the prompt, receiving RF resource configuration parameter values from the user, conveying the RF resource configuration information to a wireless broadband communications system operator, wherein the RF resource configuration information is based on the RF resource configuration parameter values received from the user, and in response to conveying the received RF resource configuration information, receiving an RF resource allocation.

Another embodiment of the present invention encompasses an automated method for configuring RF resources for a CPBS. The method includes setting up a communication session with an MS, wherein the communication session utilizes a downlink transmit power and one or more radio frequencies allocated to the CPBS, exchanging data packets between the CPBS and the MS, determining a signal quality for each exchanged packet, determining one or more of a throughput and an error rate for the communication session based on the determined signal qualities, conveying the determined one or more of a throughput and an error rate to a wireless broadband communications system operator, and in response to conveying the determined one or more of a throughput and an error rate, receiving one or more of an adjusted downlink transmit power and a new radio frequency allocation.

Yet another embodiment of the present invention encompasses customer premises base station that includes a user interface having a display screen, and a processor that is configured to prompt a user, via the display screen, for RF resource configuration parameter values, in response to the prompt, receiving RF resource configuration parameter values from the user, convey the RF resource configuration information to a wireless broadband communications system operator, wherein the RF resource configuration information is based on the RF resource configuration parameter values received from the user, and in response to conveying the received RF resource configuration information, receive an RF resource allocation.

Still another embodiment of the present invention encompasses customer premises base station that includes a user interface having a display screen, and a processor that is configured to set up a communication session with a mobile station, wherein the communication session utilizes a downlink transmit power and one or more radio frequencies allocated to the CPBS, exchange data packets with the mobile station, determining a signal quality for each exchanged packet, determine one or more of a throughput and an error rate for the communication session based on the determined signal qualities, convey the determined one or more of a throughput and an error rate to a wireless broadband communications system operator, and in response to conveying the determined one or more of a throughput and an error rate, receive one or more of an adjusted downlink transmit power and a new radio frequency allocation.

Figure 1:
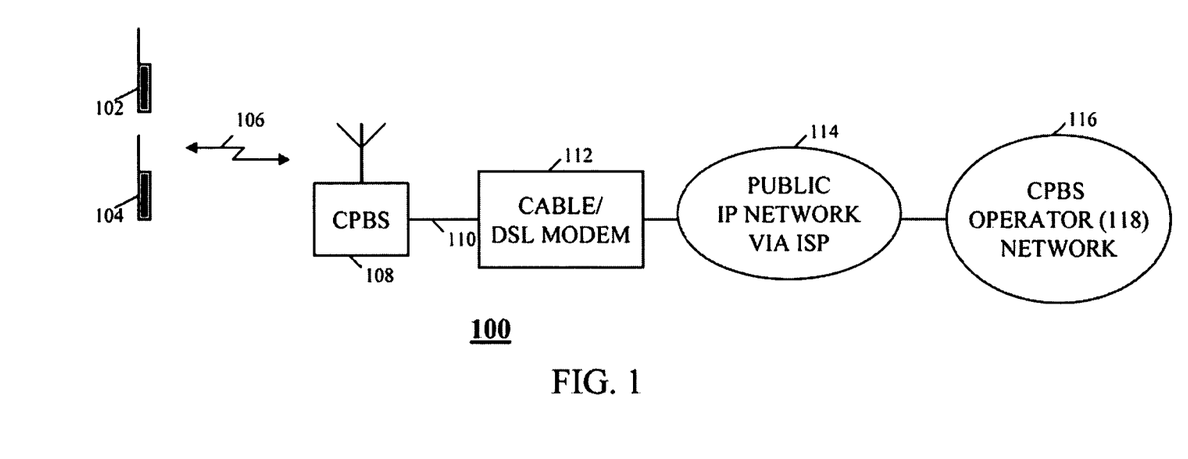
FIG. 1 is a block diagram of a wireless communication system in accordance with an embodiment of the present invention.

The present invention may be more fully described with reference to FIGS. 1-9. FIG. 1 is a block diagram of a wireless communication system 100 in accordance with an embodiment of the present invention. Communication system 100 includes a customer premises base station (CPBS) 108, that is, a "plug and play" wireless communication device such as a femtocell, picocell, super-femtocell, or other customer premises equipment (CPE), that may be purchased from a retail store or a cellular system operator by a subscriber, or user (hereinafter 'subscriber' and 'user' are used interchangeably), and installed by the subscriber at the subscriber's premises, such as at the subscriber's home. As part of the installation process, the subscriber couples CPBS 108 to a broadband router 112, such as a cable or digital subscriber line (DSL) modem, at the subscriber's premises via a local broadband connection 110, for example, a WiFi or Ethernet connection, and powers up the CPBS. CPBS 106 then is able to communicate with a network 116 of an associated CPBS operator 118, preferably a femtocell operator that operates a cellular network or other wireless broadband communication system and whose services are subscribed to by the subscriber, for example, Verizon®, T-Mobile®, Sprint®, AT&T®, or Comcast®, via a public Internet Protocol (IP) network 114, such as the Internet, and a IP network service provider (ISP).

Wireless communication system 100 further includes at least one mobile station (MS) 102, 104 (two shown) such as but not limited to a cellular telephone, a radio telephone, a personal digital assistant (PDA) with radio frequency (RF) capabilities, or a wireless-enabled laptop computer. Upon being powered up, registering with CPBS operator 118, and configuring its wireless resources, CPBS 108 provides wireless communication services to each MS residing in a coverage area of the CPBS, such as MSs 102 and 104, via an air interface 106. Air interface 106 includes a downlink and an uplink. Each of downlink and uplink comprises multiple physical and logical communication channels, including at least one signaling channel and at least one traffic channel.

Figure 2:
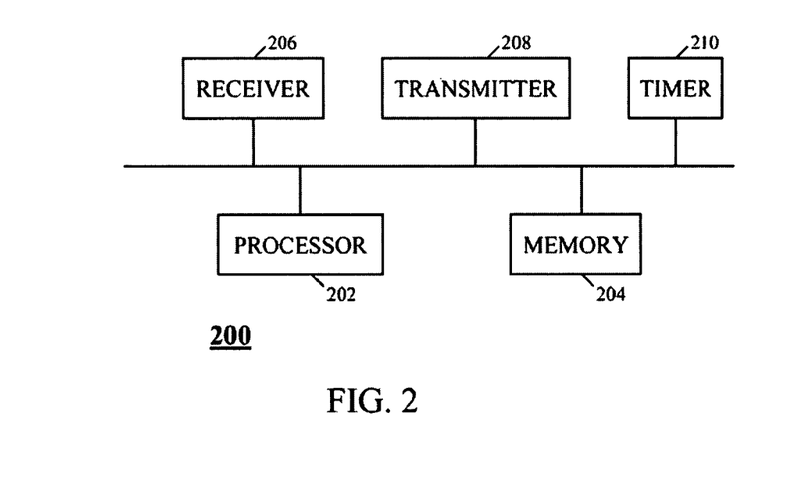
FIG. 2 is a block diagram of a mobile station of FIG. 1 in accordance with an embodiment of the present invention.

Referring now to FIG. 2, a block diagram is provided of an MS 200, such as MSs 102 and 104, in accordance with an embodiment of the present invention. MS 200 includes a processor 202, such as one or more microprocessors, microcontrollers, digital signal processors (DSPs), combinations thereof or such other devices known to those having ordinary skill in the art. The particular operations/functions of processor 202, and respectively thus of MS 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the processor. MS 200 further includes a receiver 206 and transmitter 208 in communication with processor 202 for receiving signals from, and transmitting signals to, CPBS 108 in accordance with techniques known in the art. MS 200 supports wireless data services, including a packet data voice call such as a Voice over Internet Protocol (VoIP) call, and preferably is a Session Internet Protocol (SIP)-based MS that is capable of setting up a voice or data communication session using SIP. Unless otherwise specified herein, the functions described herein as being performed by MSs 102 or 104 are performed by the processor 202 of the MS.

Figure 3:
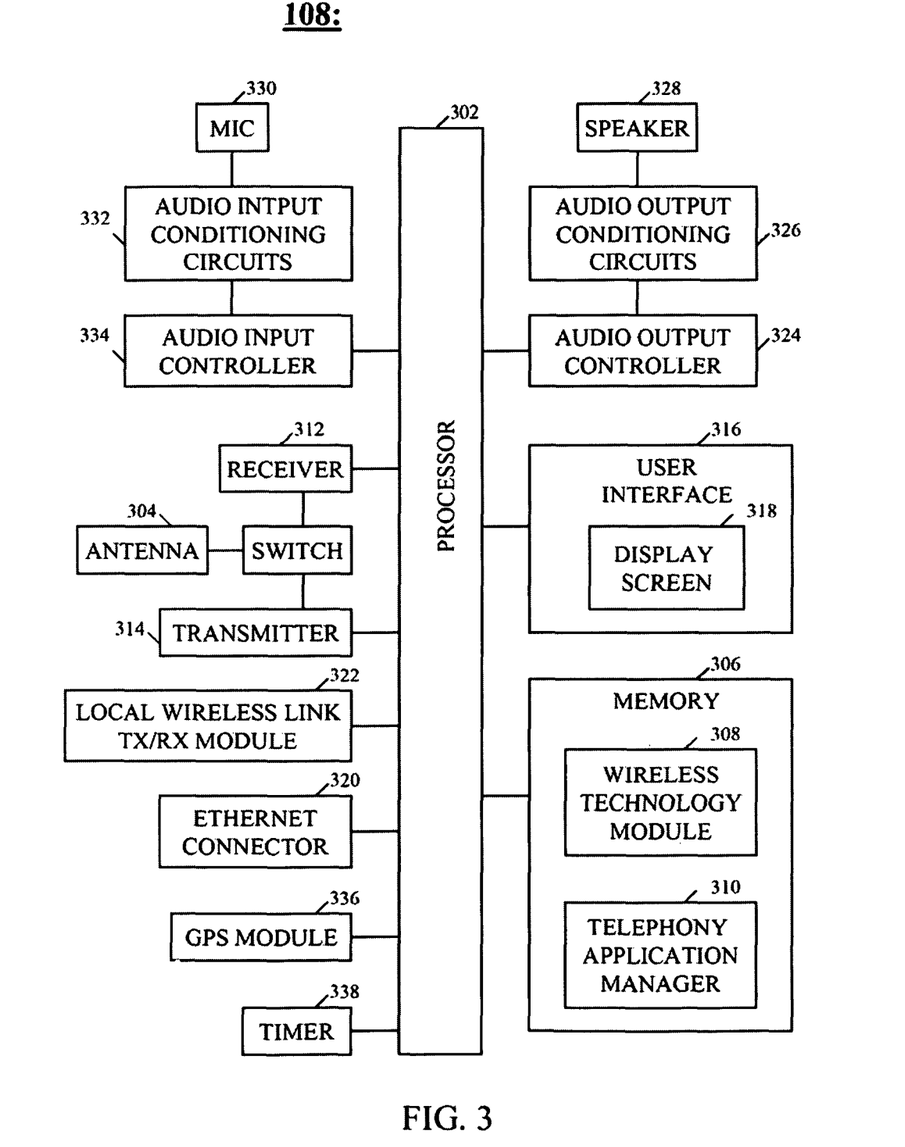
FIG. 3 is a block diagram of a customer premises base station of FIG. 1 in accordance with various embodiments of the present invention.

Referring now to FIG. 3 a block diagram is provided of CPBS 108 in accordance with an embodiment of the present invention. Preferably, CPBS 108 comprises a digital picture frame capable of displaying digitally stored images on an included display screen and that further includes (1) a femtocell that provides wireless communication services to MSs residing in a coverage area of the femtocell and (2) MS functionality for setting up and engaging in a packet data voice call.

CPBS 108 operates under the control of a processor 302, such as one or more microprocessors, microcontrollers, digital signal processors (DSPs), combinations thereof or such other devices known to those having ordinary skill in the art. Processor 302 controls the operation of the CPBS, including an exchange of wireless communication signals with MSs 102 and 104, registration with CPBS operator 118, and the display of text and images on a user interface 316 of the CPBS. In receive mode, processor 302 electrically couples an antenna 304 via a transmit/receive switch to a wireless receiver 312. Receiver 312 decodes received signals received from MSs serviced by the CPBS, such as MSs 102 and 104, and provides those decoded signals to processor 302. In transmit mode, processor 302 electrically couples the antenna 304 via the switch to a wireless transmitter 314 for transmission of signals to MSs serviced by the CPBS. Unless otherwise specified herein, the functions described herein as being performed by CPBS 108 are performed by processor 302.

Processor 302 operates the transmitter and receiver according to instructions stored in an at least one memory device 306, such as random access memory (RAM), dynamic random access memory (DRAM), and/or read only memory (ROM) or equivalents thereof, that stores data and programs that may be executed by the processor so that the CPBS may perform the functions described herein, and that stores pictures that may be displayed upon a display screen 318 of user interface 316. For example, among the data and programs stored by the at least one memory device 306 are registration instructions, so that the CPBS may register with CPBS operator 118 upon being powered up, and manual and automated radio frequency (RF) resource configuration routines, including an RF resource configuration menu that may be used by a user to input RF resource configuration parameters into the CPBS. At least one memory device 306 further maintains routing information for CPBS operator 118, for example, IP addresses associated with the operator, so that CPBS 108 may communicate with the CPBS operator upon being powered up and connected to public IP network 114.

At least one memory device 306 further includes a cellular wireless technology module 308 and a telephony application manager 310. Wireless technology module 308 maintains data and programs for communicating with MSs 102 and 104 via one or more cellular technologies, such as Code Division Multiple Access 2000 (CDMA 2000), Universal Mobile Telecommunication System (UMTS), Frequency Division Multiple Access (FDMA), Time Division Multiple Access (TDMA), Wireless Local Area Network (WLAN) as described by the IEEE (Institute of Electrical and Electronics Engineers) 802.xx standards, for example, the 802.11, 802.15, 802.16, or 802.20 standards, or Orthogonal Frequency Division Multiple Access (OFDM). Telephony application manager 310 maintains data and programs such as are maintained by a 3G (Third Generation) or 4G (Fourth Generation) MS for setting up and managing a packet data communication session, for example, a VoIP call, using SIP and via CPBS operator 118.

User interface 316 provides a user of CPBS 108 with the capability of interacting with the CPBS, including inputting instructions into the CPBS. User interface 316 includes display screen 318 upon which processor 302 may display, for example, pictures or text stored in at least one memory device 306. Display screen 318 comprises a touch screen that is able to determine a position (i.e., an X-coordinate and a Y-coordinate) of a user's touch on the touch screen and convey the position data to processor 302. Based on the position data, processor 302 then translates the user's touch into an instruction.

CPBS 108 also includes one or more of an Ethernet connector 320 and a local wireless link transmit/receive module 322 that allow the CPBS to directly communicate with modem 112. The local wireless link transmit/receive module 322 allows the CPBS to directly communicate with modem 112 via a local wireless link, for example, a Bluetooth link, an Infrared Data Access (IrDA) link, a WiFi link, or the like.

CPBS 108 further includes an audio output controller 324 that receives decoded audio output signals from Ethernet connector 320 or local wireless link transmit/receive module 322. The audio controller 324 sends the received decoded audio signals to audio output conditioning circuits 326 that perform various conditioning functions. For example, the audio output conditioning circuits 326 may reduce noise or amplify the signal. A speaker 328 receives the conditioned audio signals and allows audio output for listening by a user. CPBS 108 also includes a microphone 330 for allowing a user to input audio signals into the CPBS. Sound waves are received by the microphone 330 and are converted into an electrical audio signal. Audio input conditioning circuits 332 receive the audio signal and perform various conditioning functions on the audio signal, for example, noise reduction. An audio input controller 334 receives the conditioned audio signal and sends a representation of the audio signal to processor 302.

CPBS 108 also may include a Global Positioning System (GPS) module 336. The GPS module 336 determines the location and/or velocity information of the CPBS. GPS module 336 uses the GPS satellite system to determine a location of CPBS 108. Alternative to the GPS module 336, CPBS 108 may include alternative modules for determining a location of the CPBS, for example, using cell tower triangulation and assisted GPS.

Figure 4:
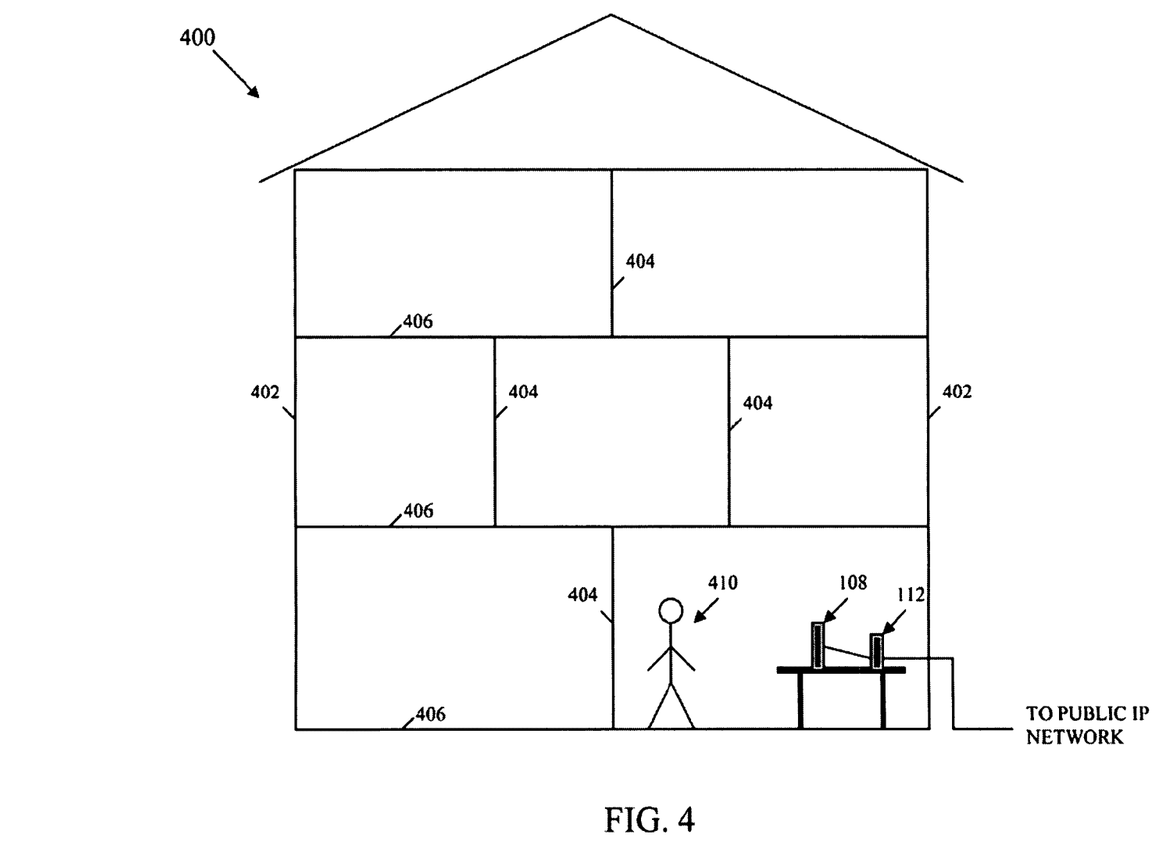
FIG. 4 is an overview of a setup of a customer premises base station of FIG. 1 on a customer's premises in accordance with an embodiment of the present invention.

Referring now to FIG. 4, an overview is provided of an exemplary setup of a CPBS 108 on a customer's premises 400 in accordance with an embodiment of the present invention. As depicted in FIG. 4, the customer's premises has numerous obstacles that may affect the radio frequency (RF) coverage provided by the CPBS, for example, exterior walls 402, interior walls 404, floors 406, doors (not shown), and windows (not shown). In order to permit CPBS operator 118 to determine the specific RF needs of a customer, that is, user 410 (also referred to herein as a "subscriber"), and to allocate wireless resources to CPBS 108 in accordance with those needs, communication system 100 provides an adaptive feedback scheme, where parameter values particular to the user are fed back to the CPBS operator and the CPBS operator allocates RF resources to CPBS 108 based on those particular values.

Figure 5A:
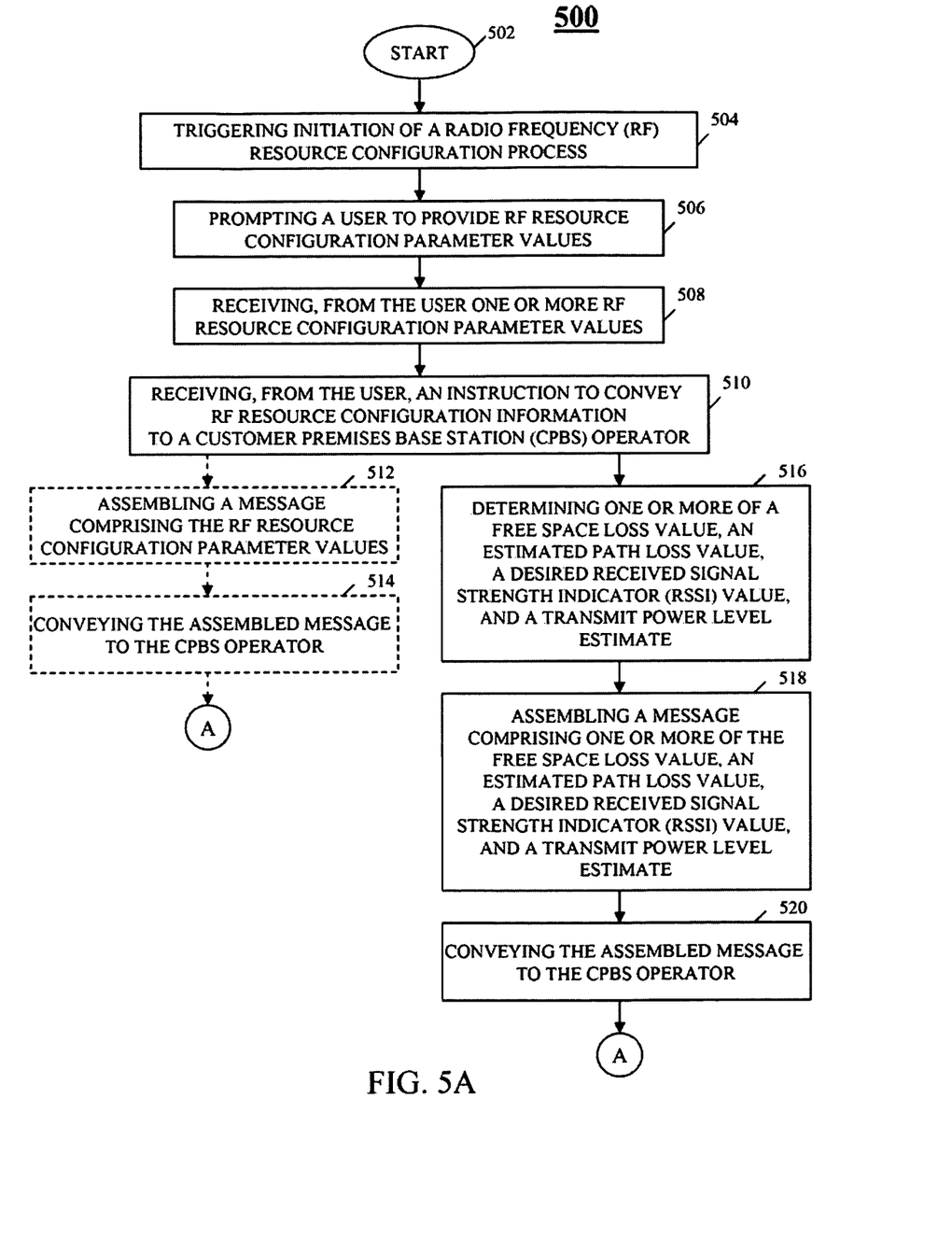
FIG. 5A is a logic flow diagram illustrating a method by which a user manually configures the wireless resources of the customer premises base station of FIG. 1 in accordance with various embodiments of the present invention.
Figure 5B:
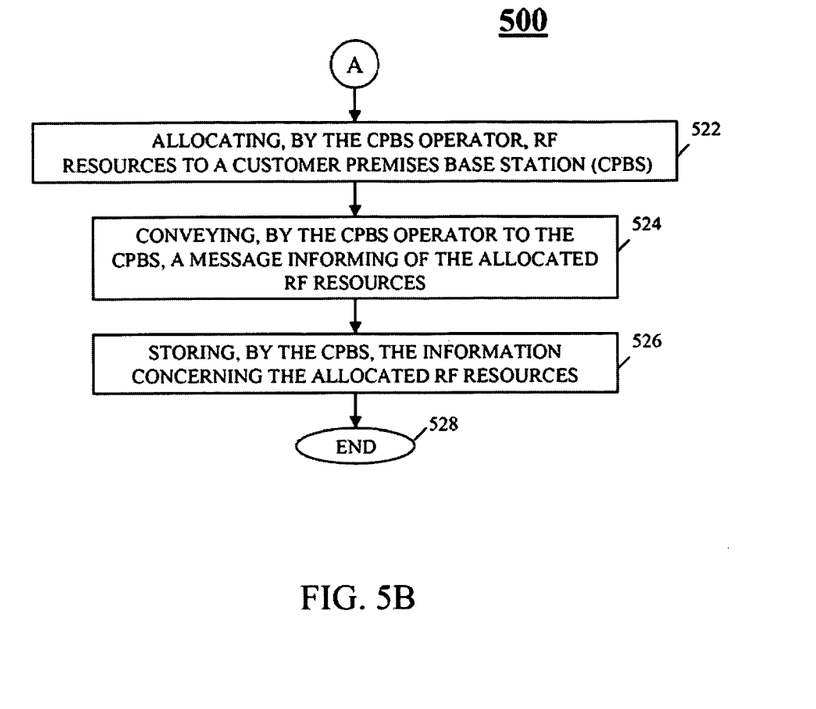
FIG. 5B is a continuation of the logic flow diagram depicted in FIG. 5A illustrating a method by which a user manually configures the wireless resources of the customer premises base station of FIG. 1 in accordance with various embodiments of the present invention.

Referring now to FIGS. 5A and 5B, a logic flow diagram 500 is provided of a method by which a user may manually configure the RF resources utilized by CPBS 108 in accordance with various embodiments of the present invention. Logic flow diagram 500 begins (502) when an RF resource configuration triggering event occurs, triggering (504) an initiation of an RF resource configuration process for CPBS 108. An event triggering an initiation of an RF resource configuration process may be any event that would indicate a need or desire to configure CPBS 108. For example, in one embodiment of the present invention, an RF resource configuration initiation event may be the installation of the CPBS by a user, such as user 410, including connecting the CPBS to the CPBS operator 118 via modem 112 and a powering up of the CPBS. In another embodiment of the present invention, an RF resource configuration initiation event may comprise a detecting, by the CPBS, of an MS in the coverage area of the CPBS. In yet another embodiment of the present invention, the user 410 may initiate an RF resource configuration initiation event by calling up an RF resource configuration menu on the display screen 318 of the CPBS, that is, inputting an instruction into the CPBS, via a softkey on the touch screen (that is, display screen 318), to display the RF resource configuration menu.

In response to the occurrence of a triggering event, CPBS 108 prompts (506) the user to provide RF resource configuration parameter values. For example, CPBS 108 may display, on display screen 318, an RF resource configuration menu maintained in at least one memory device 306. The RF resource configuration menu includes a listing of RF resource configuration parameters, that is, parameters that affect the radio frequency (RF) coverage provided by CPBS 108 and whose values may be used to determine an RF resource configuration of the CPBS. The RF resource configuration menu further includes spaces to input values for the RF resource configuration parameters, and a touchscreen keypad that facilitates the user moving around the menu and inputting the values into the menu. For example, the RF resource configuration parameters may comprise physical features of the customer premises, such as a number of exterior walls (or an average number of walls), a number of floors, a number of doors (or an average number of doors, for example, per floor), a number of windows (or an average number of windows, for example, per floor), a number of internal walls (or an average number of interior walls, for example, per floor), a number of rooms of the premises or per floor (or an average number of rooms per floor), and an area of a floor plan of the premises, such as an average number of square feet per room or per floor. This list is not exclusive and other parameters that may impact RF coverage may occur to one of ordinary skill in the art and may be used herein without departing from the spirit and scope of the present invention.

In response to the display of the RF resource configuration menu, the user inputs into CPBS 108, and the CPBS receives (508) from the user, values for one or more RF resource configuration parameters. In one embodiment of the present invention, when the user is finished inputting RF resource configuration parameter values, the user then instructs CPBS 108, and the CPBS receives (510) an instruction from the user, to convey RF resource configuration information to CPBS operator 118. For example, the displayed keypad may include a softkey for the user to indicate that he or she is finished inputting values. By touching the softkey and indicating that he/she is finished inputting values, the user inputs an instruction into CPBS 108 to convey a message to the CPBS operator that includes RF resource configuration information, which RF resource configuration information is determined based on the parameter values input by the user. In response to receiving the instruction, CPBS 108 assembles (512) a message comprising the RF resource configuration information and conveys (514) the assembled message to CPBS operator 118.

In one embodiment of the present invention, the RF resource configuration information conveyed by CPBS 108 to CPBS operator 118 may comprise the RF resource configuration parameter values input by the user. In another embodiment of the present invention, the RF resource configuration information conveyed by CPBS 108 to CPBS operator 118 may comprise information derived from the RF resource configuration parameter values input by the user. For example, in the latter instance, in response to receiving the RF resource configuration parameter values from the user and receiving an instruction from the user to convey RF resource configuration information to the CPBS operator, CPBS 108 may determine (516) one or more of a free space loss value, an estimated path loss value based on the RF resource configuration parameter values, a desired Received Signal Strength Indicator (RSSI) value (which value may be a predetermined value maintained by at least one memory device 306), and a downlink transmit power level estimate for the CPBS. For example, CPBS 108 may use the following exemplary equations, maintained in at least one memory device 306, to determine a free space loss, a path loss estimate value, a desired RSSI value, and a downlink transmit power level estimate, $$FreeSpaceLoss = 20\ Log_{10}(\text{radius of the premises in meters}) + 20\ Log_{10}(\text{an average frequency supported by the CPBS}) - 147.56$$

$$estimatedPathLoss = (\text{average \# exterior walls}*15\ dB) + (\text{average \# interior walls}*10\ dB) + (\text{average \# windows}*1\ dB) + (\text{average \# doors}*3\ dB) + \text{free space loss}$$

$$desiredRSSI = -90\ dB$$

$$estimatedTransmitPower = desiredRSSI + estimatedPathLoss$$

Figure 6:
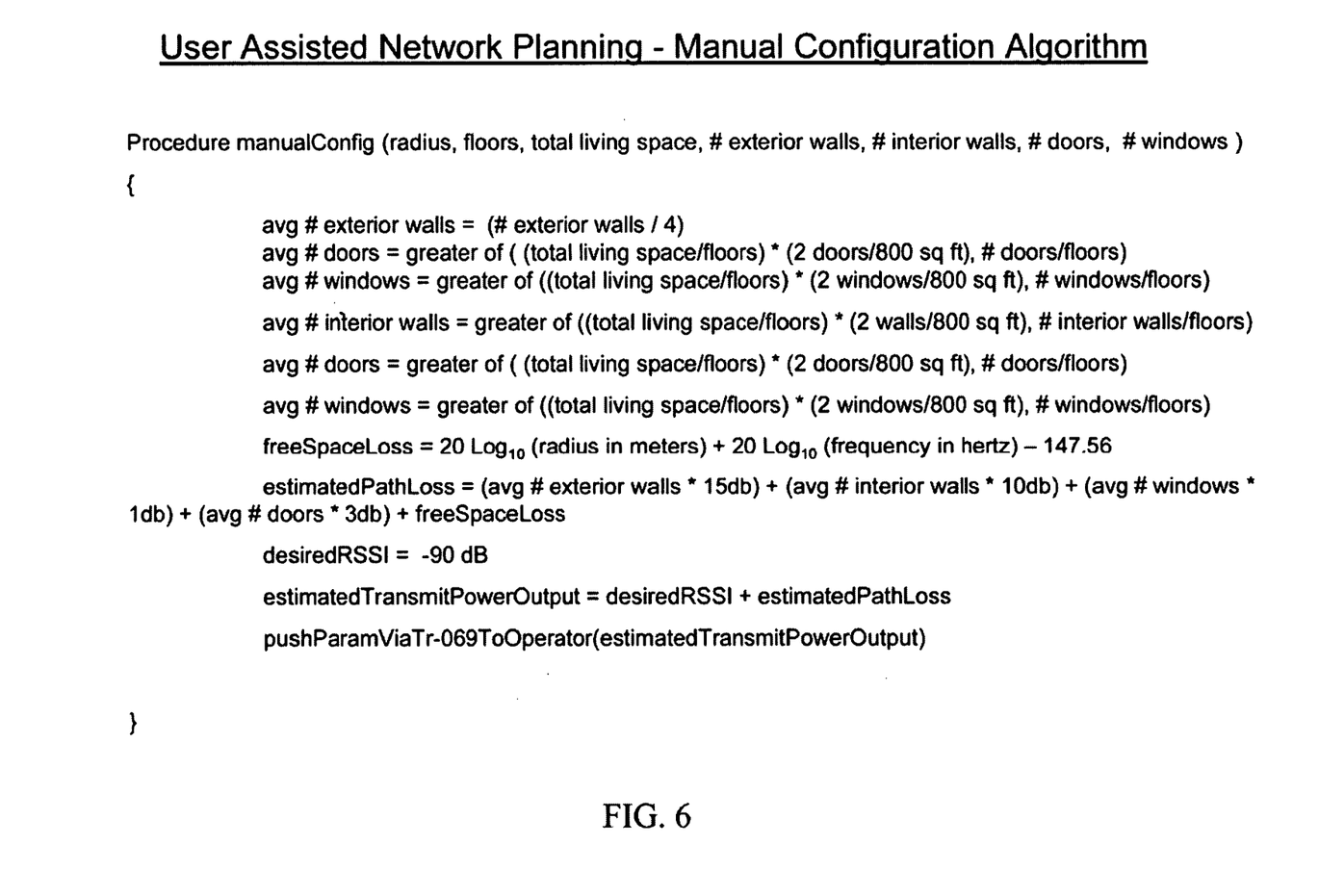
FIG. 6 is an exemplary listing of computer code that may be used to support the method of FIG. 5 by which a user manually configures the wireless resources of the customer premises base station of FIG. 1 in accordance with an embodiment of the present invention.

CPBS 108 then may assemble (518), and convey (520) to CPBS operator 118, a message comprising only the downlink transmit power level estimate, or may convey any or all of the downlink transmit power level estimate, the estimated path loss value, the desired RSSI value, and the RF resource configuration parameter values. For example, FIG. 6 depicts exemplary computer code that may be employed by CPBS 108 in determining RF resource configuration values and information based on values input by the user.

In response to receiving the one or more of the transmit power level estimate, the estimated path loss value, the desired RSSI value, and the RF resource configuration parameter values from CPBS 108, the CPBS operator allocates (522) RF resources to the CPBS, that is, allocates a downlink transmit power level and one or more RF frequencies for use by the CPBS. For example, the allocated downlink transmit power level may be the transmit power level estimate conveyed by the CPBS, or, if the CPBS does not convey a transmit power level estimate, CPBS operator 118 may use the above formulas to determine a downlink transmit power level. The allocated frequencies may be based on a frequency reuse plan implemented by the CPBS operator 118. CPBS operator 118 then conveys (524) a message back to CPBS 108 that informs of the allocated RF resources. CPBS 108 stores (526) the information concerning the allocated RF resources in at least one memory device 306 and logic flow 500 then ends (528).

Figure 7A:
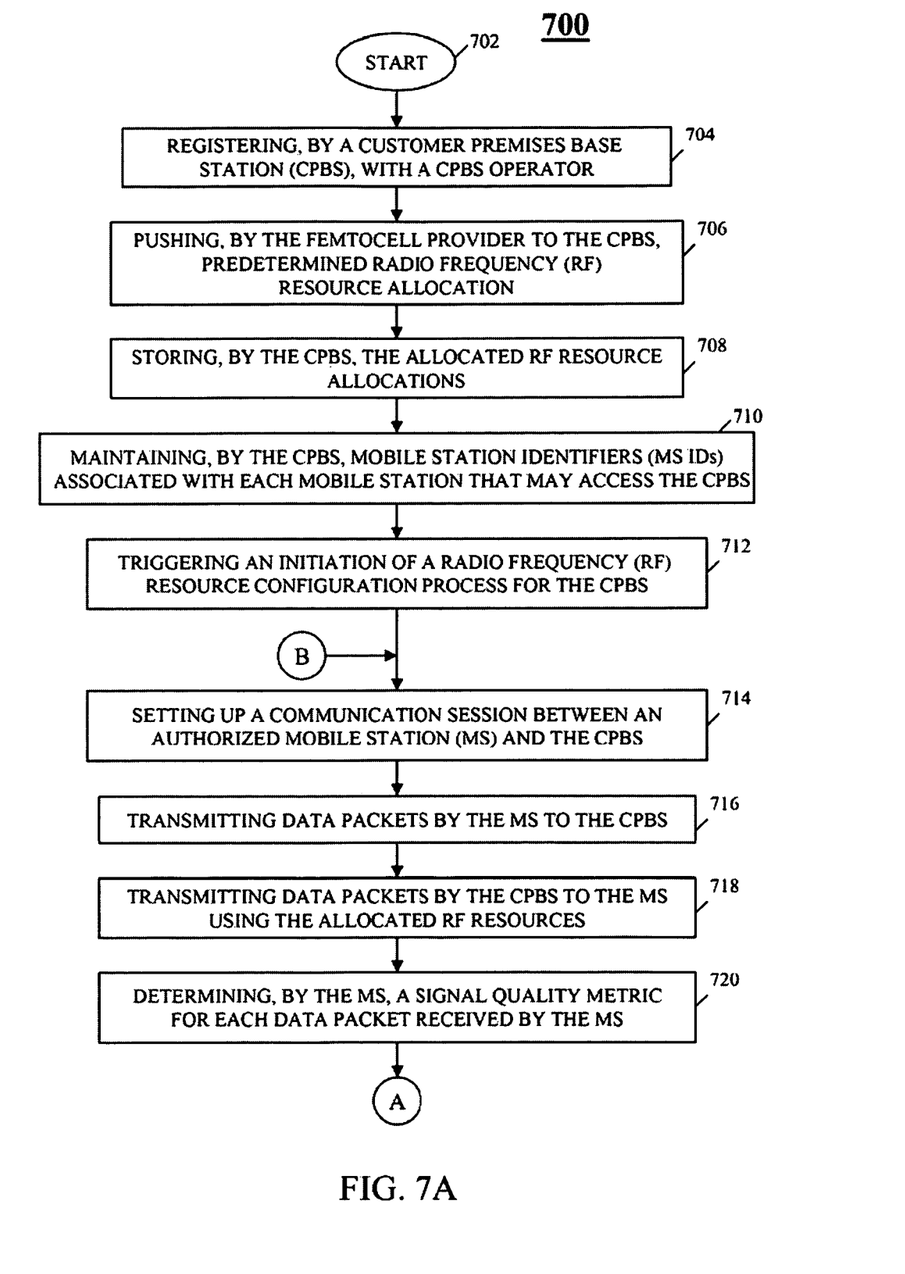
FIG. 7A is a logic flow diagram illustrating a method by which a user may configure the wireless resources of the customer premises base station of FIG. 1 in an automated manner in accordance with an embodiment of the present invention.
Figure 7B:
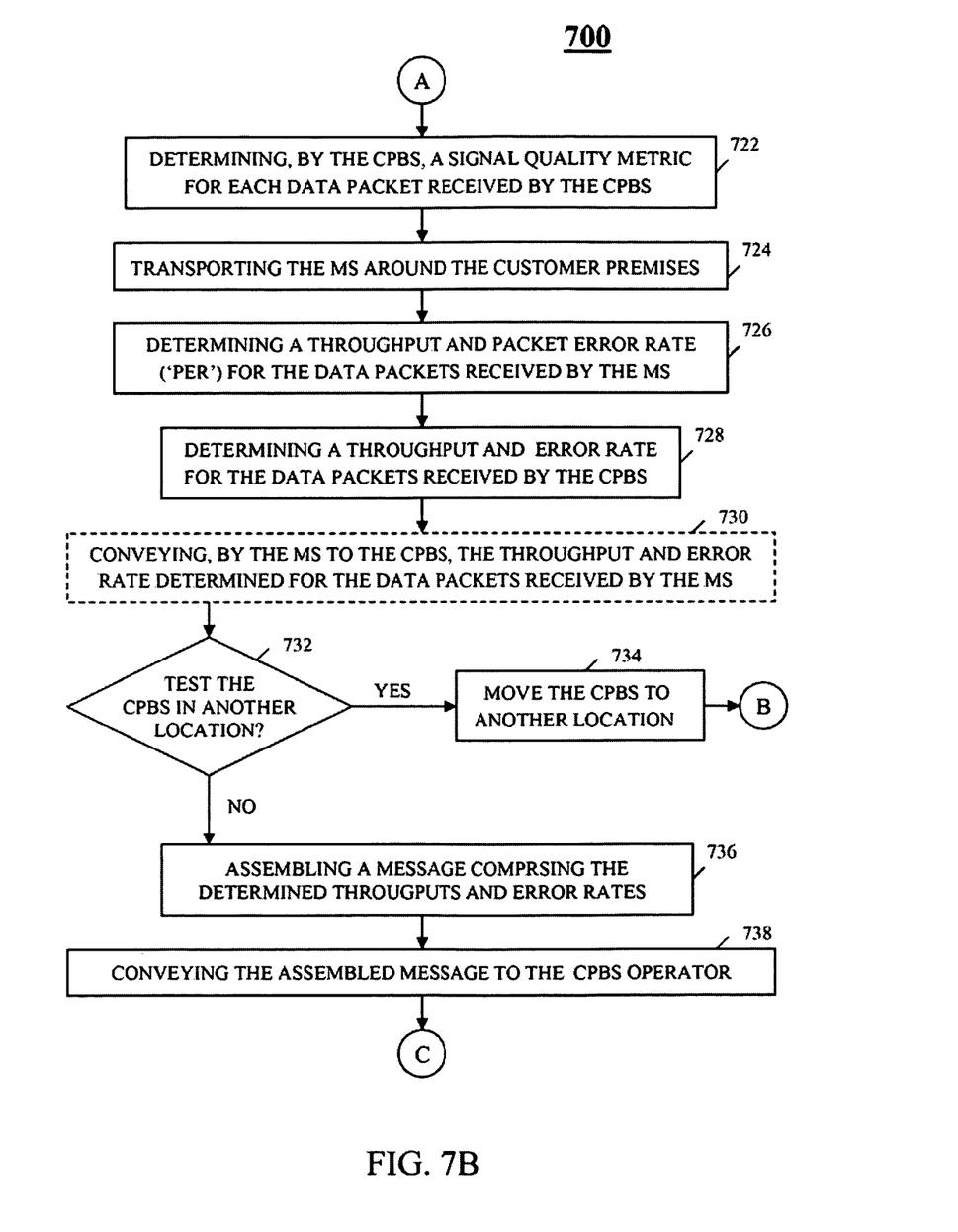
FIG. 7B is a continuation of the logic flow diagram depicted in FIG. 7A illustrating a method by which a user may configure the wireless resources of the customer premises base station of FIG. 1 in an automated manner in accordance with an embodiment of the present invention.
Figure 7C:
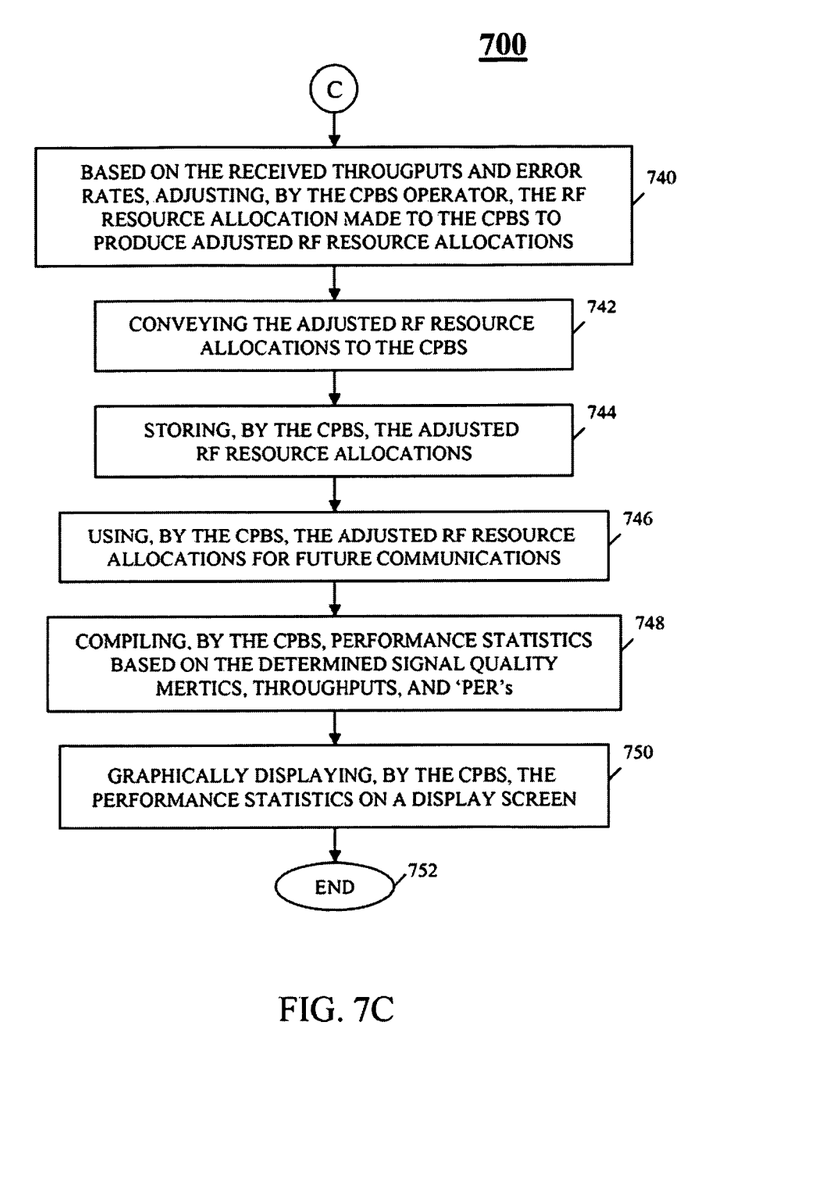
FIG. 7C is a continuation of the logic flow diagram depicted in FIGS. 7A and 7B illustrating a method by which a user may configure the wireless resources of the customer premises base station of FIG. 1 in an automated manner in accordance with an embodiment of the present invention.

In another embodiment of the present invention, instead of manually inputting RF resource configuration parameter values into CPBS 108, the CPBS may determine the RF resource configuration parameter values particular to the premises in an automated fashion. Referring now to FIGS. 7A 7B, and 7C, a logic flow diagram 700 is provided that illustrates a method by which a user may configure the wireless resources of CBPS 108 in an automated manner in accordance with an embodiment of the present invention. Similar to logic flow diagram 500, logic flow diagram 700 begins (702) when CPBS 108 is activated at a first location on the customer's premises and registers (704) with CPBS operator 118. As part of the registration process, the operator pushes (706) RF resource allocations, such as a predetermined downlink transmit power level and allocated RF frequencies, to the CPBS, which the CPBS then stores (708) in the at least one memory devices 306 of the CPBS CPBS 108 further maintains (710), in the at least one memory device 306 of the CPBS, an MS identifier (MS ID) associated with each authorized MS, that is, MS that is permitted to access the CPBS, such as MS 102. For example, when the user purchases the CPBS, a retailer may program an MS ID, such as an IMSI or a phone number associated with the MS and stored in the at least one memory device 204 of the MS, into the CPBS. By way of another example, the user may program a list of authorized MS IDs into the CPBS. By way of yet another example, when CPBS 108 is first activated, CPBS operator 118 may push a list of authorized MS IDs to the CPBS based on service plans subscribed to by the user (for example, the user may register the CPBS and the user's MS ID with the CPBS operator when purchasing the CPBS). The authorized MS IDs are then stored by CPBS 108 in the at least one memory device 306 of the CPBS.

Subsequent to registering with CPBS 108, an RF resource configuration triggering event occurs, triggering (712) an initiation of an RF resource configuration process for CPBS 108. In one embodiment of the present invention, the RF resource configuration process may be initiated by the user, for example by inputting an instruction to CPBS 108, via display screen 318, to begin the process. In another embodiment of the present invention, CPBS may prompt the user to begin the process when the CPBS realizes that the MS is powered up but in an idle state.

In initiating the process, CPBS 108 sets up (714) a communication session with an authorized MS, that is, MS 102. For example, CPBS 108 may page the MS, that is, MS 102, and instruct the MS to tune to a designated traffic channel in air interface 106. Alternatively, a signaling channel of air interface 106 may be used. As part of the set up of the communication session, CPBS 108 assigns to MS 102 one or more of the RF frequencies allocated by CPBS operator 118 to the CPBS. MS 102 then begins (716) transmitting data packets, that is, packet data units (PDUs), comprising designated data known to both the MS and CPBS, to the CPBS on the uplink of air interface 106 using the assigned one or more RF frequencies and the CPBS begins (718) transmitting PDUs to the MS on the downlink of air interface 106 using the RF resources, that is, the RF frequencies and downlink transmit power levels, allocated to the CPBS.

For example, in one embodiment of the present invention, if a coverage area test application is stored in the at least one memory devices 204, 306, of the MS and CPBS, such as 'Test Application Specification' (TAS) software defined in the 3GPP2 (Third Generation Partnership Project) specification C.S0029, sections 4.2, 4.3, 4.4, and 4.5, then the MS and CPBS may execute this software. In another embodiment of the present invention, if the MS does not have a coverage area test application, then the CPBS or MS may set up a call with the MS or CPBS, respectively.

In response to receiving the PDUs, MS 102 and CPBS 108 each determines (720, 722) a signal quality metric, such as a signal to noise ratio (SNR), a bit error rate (BER), a carrier to interference ratio (C/I), or any other signal quality metric or Layer 2 performance metric that may occur to one of ordinary skill in the art, for each received PDU and stores the determined signal quality metrics. A predetermined number of PDUs then may be transmitted by each of MS 102 and CPBS 108, for example, 1000 PDUs, or each of MS 102 and CPBS 108 then may transmit PDUs for a predetermined test time period. In the latter instance, each of MS 102 and CPBS 108 may include a respective timer 210, 338 that is respectively coupled to the processor 202, 302 of the MS and CPBS and that counts down the predetermined time period.

Figure 8A:
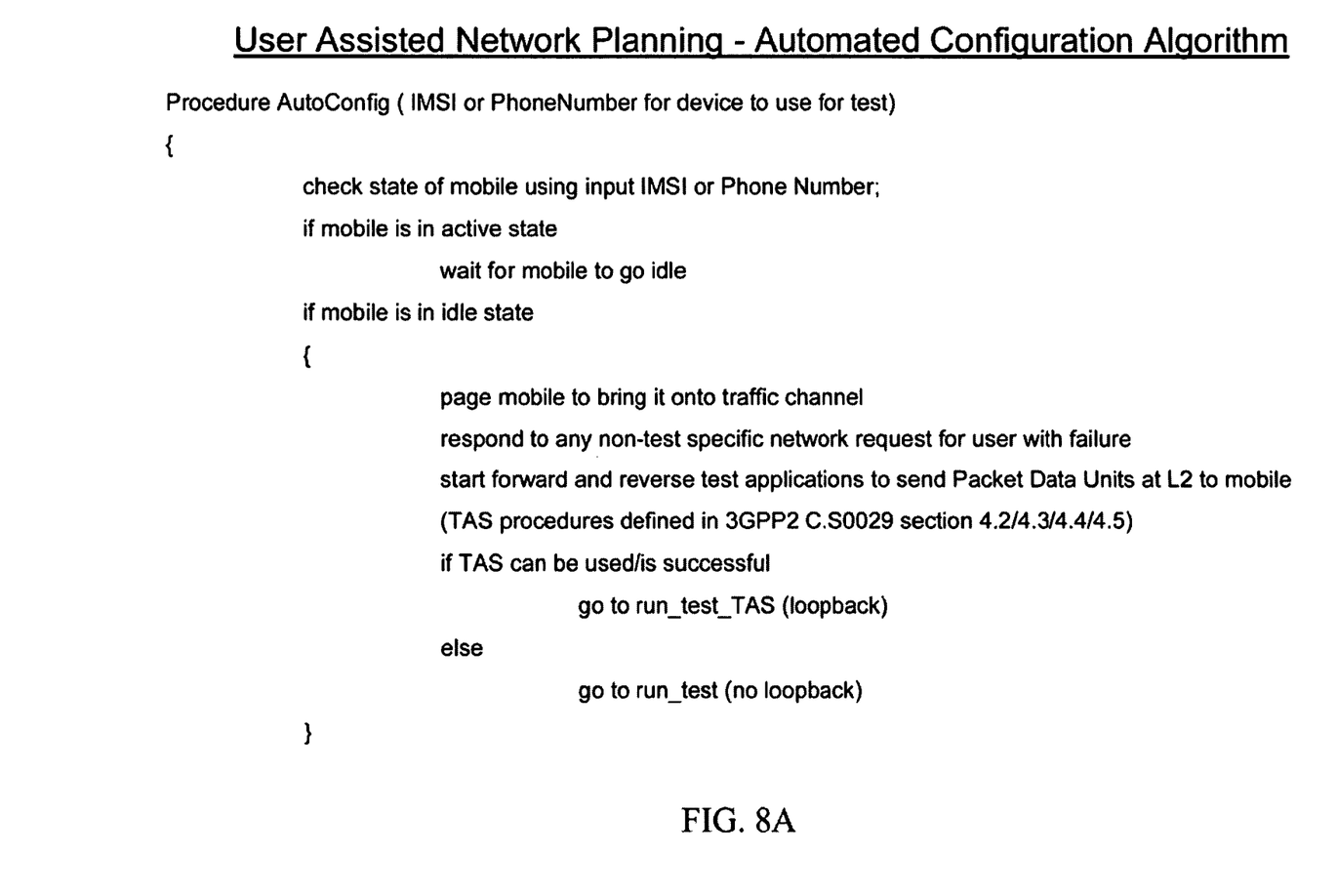
FIG. 8A is an exemplary listing of computer code that may be used to support the method of FIG. 7, by which a user configures the wireless resources of the customer premises base station of FIG. 1 in an automated manner, in accordance with an embodiment of the present invention.
Figure 8B:
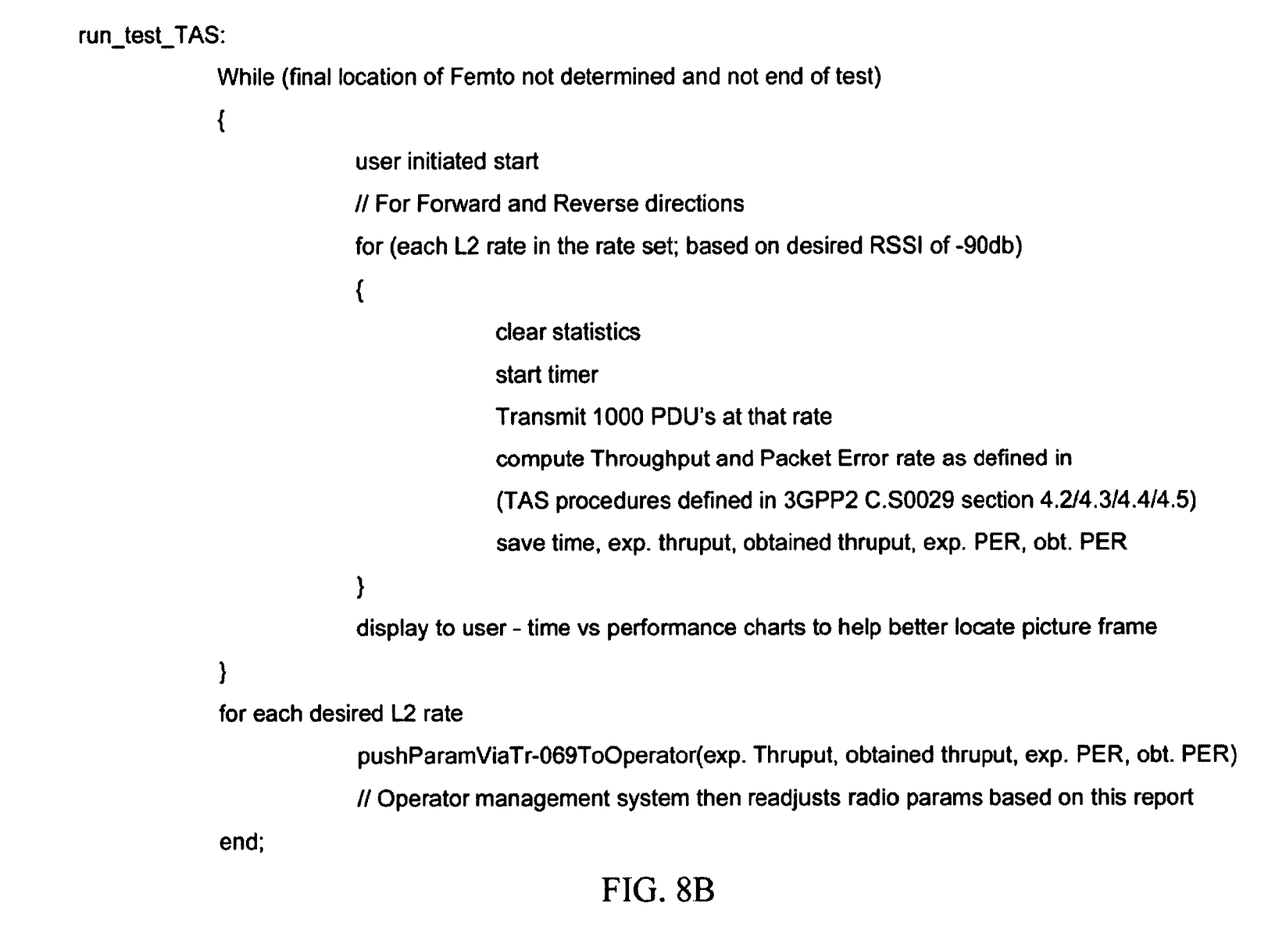
FIG. 8B is a continuation of the computer code of FIG. 8A that may be used to support the method of FIG. 7 by which a user configures the wireless resources of the customer premises base station of FIG. 1 in an automated manner in accordance with an embodiment of the present invention.

While the MS and CPBS are exchanging PDUs, the user transports (724) the MS around the customer premises so that the entire customer's premises are covered, or at least the remote areas of the customer's premises are covered, during the exchange of PDUs. When the test process is complete, that is, the predetermined number of PDUs have been exchanged or the timer has expired, a downlink throughput and error rate, preferably a packet error rate (PER), is determined (726, 728) for the PDUs received by the MS (preferably determined by the MS) and an uplink throughput and error rate, preferably a PER, is determined for the PDUs received by the CPBS (preferably determined by the CPBS). The downlink throughput and error rate and uplink throughput and error rate are determined based on the signal quality metrics determined with respect to the PDUs received over the downlink and uplink, respectively, for example, as is defined in the 3GPP2 specification C.S0029, sections 4.2, 4.3, 4.4, and 4.5. When MS 102 determines a throughput and error rate for its received PDUs, the MS then conveys (730), to CPBS 108, the throughput and error rate determined by the MS. For example, FIGS. 8A and 8B depicts exemplary computer code that may be employed by MS 102 and CPBS 108 in performing such a test. Alternatively, MS 102 may convey downlink signal quality metric information to CPBS 108 and the CPBS may determine the downlink throughput and error rate.

Figure 9:
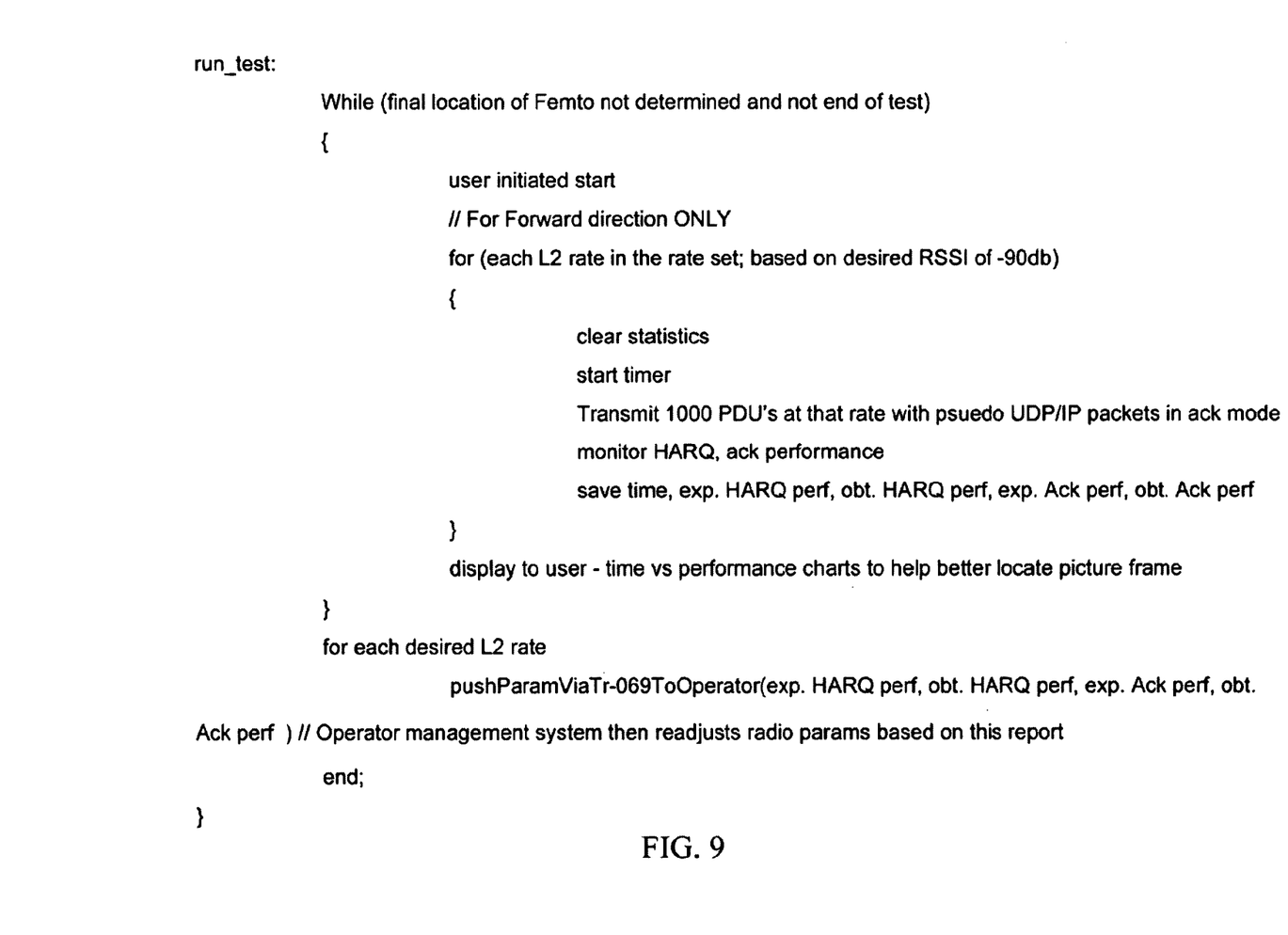
FIG. 9 is an exemplary listing of computer code that may be used to support the method of FIG. 7, by which a user configures the wireless resources of the customer premises base station of FIG. 1 in an automated manner, in accordance with another embodiment of the present invention.

In another embodiment of the present invention, instead of MS 102 and CPBS 108 exchanging data packets, data packets may be conveyed only in a single direction, for example, only over the downlink of air interface 106. Again, a predetermined number of data packets may be transmitted or data packets may be transmitted for a predetermined test time period. A signal quality metric then may be determined for each received data packet, such as the signal quality metrics specified above or a Hybrid ARQ (Automatic Repeat reQuest) statistic, such as a number of retransmissions or ACK/NACK performance. For example, FIG. 9 depicts exemplary computer code that may be employed by MS 102 and CPBS 108 in performing such a uni-directional test.

If the user desires, the user may then move (734) CPBS 108 to a second test location on the customer's premises, a third test location on the customer's premises, and so on, wherein at each such location one or more of steps (714)-(730) are re-executed (732), that is, the CPBS and MS re-execute whichever steps are appropriate depending upon whether bi-directional or uni-directional testing is being performed. The user may initiate each test by inputting via display screen 318, that is, by touching a designated softkey on the display screen, an instruction to again begin the test. When the user is finished (732) testing all desired locations of CPBS 108, the user informs the CPBS that the testing is complete, for example, by touching a designed softkey on display screen 318. CPBS 108 then assembles (736) one or more messages with the test results, that is, the throughput and PER determined for each test, that is, at each test location, so that the test results are sent together, that is, in a same message or set of messages, and conveys (738) the message comprising the test results to CPBS operator 118. In response to receiving the test results, CPBS operator 118 adjusts (740) the RF resources allocated to CPBS 108, for example, adjusting the allocated downlink transmit power and/or allocating new RF frequencies, to produce an adjusted RF resource allocation. CPBS operator 118 conveys (742) the adjusted RF resource allocation to CPBS 108, and the CPBS stores (744) the adjusted RF resource allocation in the at least one memory device 306 of the CPBS and uses (746) the adjusted RF resource allocation in future communications in the CPBS's coverage area.

In addition, when the testing is complete, CPBS 108 may compile (748) performance statistics based on the determined signal quality metrics, throughput, and/or error rates (for example, PERs) and graphically display (750) the compiled performance statistics on display screen 318 for viewing by the user. For example, CPBS 108 may determine and display a time v. performance (signal quality metrics) graph for each test, and/or a test v. performance (PER or throughput) chart covering all of the tests, and display the graphs(s) and/or chart in display screen 318. The user then can use these graphs(s) and/or chart to determine a desired location for the CPBS. Logic flow 700 then ends (752).

By providing a method and apparatus whereby a user can manually provide, or a CPBS can automatically determine, RF resource configuration parameter values associated with a customer's premises, for example, physical features of a customer's premises, the present invention allows a system operator to determine a specific user's needs and to allocate resources to a CPBS, such as a femtocell, in accordance with those needs. In a manual embodiment, the CPBS prompts a user for RF resource configuration parameter values. In response to the prompt, the user inputs RF resource configuration parameter values, such as physical features of a customer's premises, to the CPBS. The CPBS then conveys RF resource configuration information to a wireless broadband communications system operator, wherein the RF resource configuration information is based on the RF resource configuration parameter values received from the user, and in response to conveying the received RF resource configuration information, the CPBS receives an RF resource allocation. In an automated embodiment, the CPBS sets up a communication session with an MS of the user based on RF resources allocated to the MS. The CPBS then collects RF resource configuration parameter values via an exchange of data packets with the MS, which collected values are used to determine a throughput and an error rate that are conveyed to a wireless broadband communications system operator. The operator then uses the throughput and an error rate to adjust the RF resource allocation.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for configuring radio frequency (RF) resources for a customer premises base station (CPBS) comprising:
   prompting, by the CPBS, a user for RF resource configuration parameter values;
   in response to the prompt, receiving RF resource configuration parameter values from the user;
   conveying the RF resource configuration information to a wireless broadband communications system operator, wherein the RF resource configuration information is based on the RF resource configuration parameter values received from the user;
   in response to conveying the received RF resource configuration information, receiving an RF resource allocation and
   determining a desired location for the CPBS based on the received RF resource allocation.

2. The method of claim 1, wherein the radio frequency resource configuration parameter values comprise physical features of the user's premises.

3. The method of claim 2, wherein the radio frequency resource configuration parameter values comprise one or more of a number of doors, a number of walls, a number of floors, a number of windows, and an area of a floor plan.

4. The method of claim 1, wherein conveying radio frequency (RF) resource configuration information to a wireless broadband communications system operator comprises conveying the RF resource configuration parameter values received from the user.

5. The method of claim 1, wherein conveying radio frequency (RF) resource configuration information to a wireless broadband communications system operator comprises conveying RF resource configuration information derived from the RF resource configuration parameter values received from the user.

6. The method of claim 5, wherein the radio frequency (RF) resource configuration information comprises one or more of a free space loss value, an estimated path loss value that is determined based on the RF resource configuration parameter values, a desired Received Signal Strength Indicator value, and a transmit power level estimate that is determined based on the RF resource configuration parameter values.

7. The method of claim 1, wherein receiving a radio frequency resource allocation comprises receiving one or more of a downlink transmit power allocation and an allocation of one or more radio frequencies.

8. A customer premises base station comprising:
   a user interface having a display screen;
   a processor that is configured to prompt a user, via the display screen, for radio frequency (RF) resource configuration parameter values, in response to the prompt, receiving RF resource configuration parameter values from the user, convey the RF resource configuration information to a wireless broadband communications system operator, wherein the RF resource configuration information is based on the RF resource configuration parameter values received from the user, and in response to conveying the received RF resource configuration information, receive an RF resource allocation and determine a desired location for the customer premises base station based on the received RF resource allocation.

9. The customer premises base station of claim 8, wherein the radio frequency resource configuration parameter values comprise physical features of the user's premises.

10. The customer premises base station of claim 9, wherein the radio frequency resource configuration parameter values comprise one or more of a number of doors, a number of walls, a number of floors, a number of windows, and an area of a floor plan.

11. The customer premises base station of claim 8, wherein the processor is configured to convey radio frequency (RF) resource configuration information to a wireless broadband communications system operator by conveying the RF resource configuration parameter values received from the user.

12. The customer premises base station of claim 8, wherein the processor is configured to convey radio frequency (RF) resource configuration information to a wireless broadband communications system operator by conveying RF resource configuration information derived from the RF resource configuration parameter values received from the user.

13. The customer premises base station of claim 12, wherein the radio frequency (RF) resource configuration information comprises one or more of a free space loss value, an estimated path loss value that is determined based on the RF resource configuration parameter values, a desired Received Signal Strength Indicator value, and a transmit power level estimate that is determined based on the RF resource configuration parameter values.

14. The customer premises base station of claim 8, wherein the processor is configured to receive a radio frequency resource allocation by receiving one or more of a downlink transmit power allocation and an allocation of one or more radio frequencies.

\* \* \* \* \*